United States Patent [19]

Wahren

[11] 3,768,631
[45] Oct. 30, 1973

[54] CONVEYOR BELT CHAIN

[76] Inventor: Ejvin Janne Ragnvald Wahren, Masbargrand 4, Vadstena, Sweden

[22] Filed: Nov. 12, 1971

[21] Appl. No.: 198,157

[52] U.S. Cl. ................. 198/189, 74/246, 71/250 C
[51] Int. Cl. ............................................. B65g 17/06
[58] Field of Search ............................. 74/250, 246; 198/189

[56] References Cited
UNITED STATES PATENTS

| | | | |
|---|---|---|---|
| 1,965,285 | 7/1934 | Gilstad | 74/246 |
| 2,586,268 | 2/1952 | Smith | 74/246 |
| 3,344,905 | 10/1967 | Von Hofen | 74/246 X |
| 1,841,592 | 1/1932 | Edwards | 74/246 X |
| 1,861,642 | 6/1932 | Paulson | 74/246 |
| 1,956,298 | 4/1934 | Paulson | 74/246 |

Primary Examiner—Charles J. Myhre
Assistant Examiner—F. D. Shoemaker
Attorney—Hill, Sherman, Meroni, Gross & Simpson

[57] ABSTRACT

A conveyor is constructed as a series of links which directly carry the articles to be conveyed, each link including a head portion from which extends a pair of bifurcated legs for receiving and being coupled to the head portion of an adjacent link, the link further comprising a carrier portion that is integral with the head portion and the legs, the upper side of the carrier portion being a continuous flat transport surface overlying the head portion and the legs, the transport surface at one end being defined by the upper periphery of the head portion, the opposite end of the carrier portion being a web interconnecting the legs and having a concave edge corresponding in shape to the periphery of the head portion, the carrier portion further including a pair of side flange portions which extend longitudinally from the extremities of the legs and laterally to the head portion and which define the longitudinal edges of the continuous flat transport surface.

3 Claims, 8 Drawing Figures

PATENTED OCT 30 1973 3,768,631

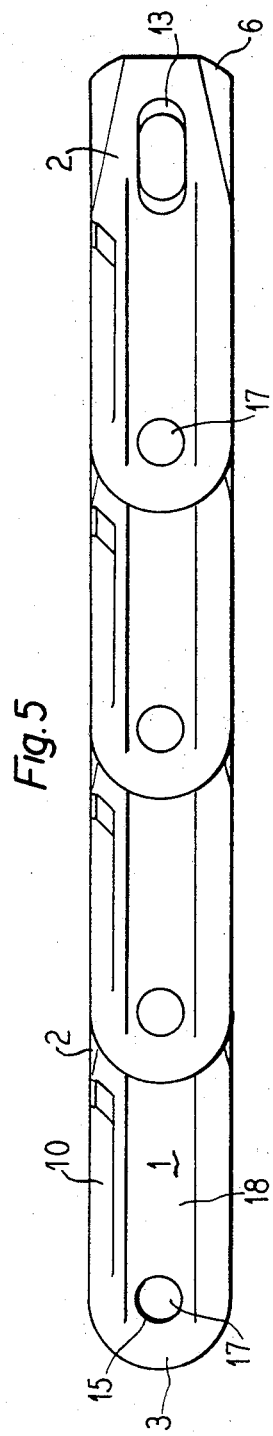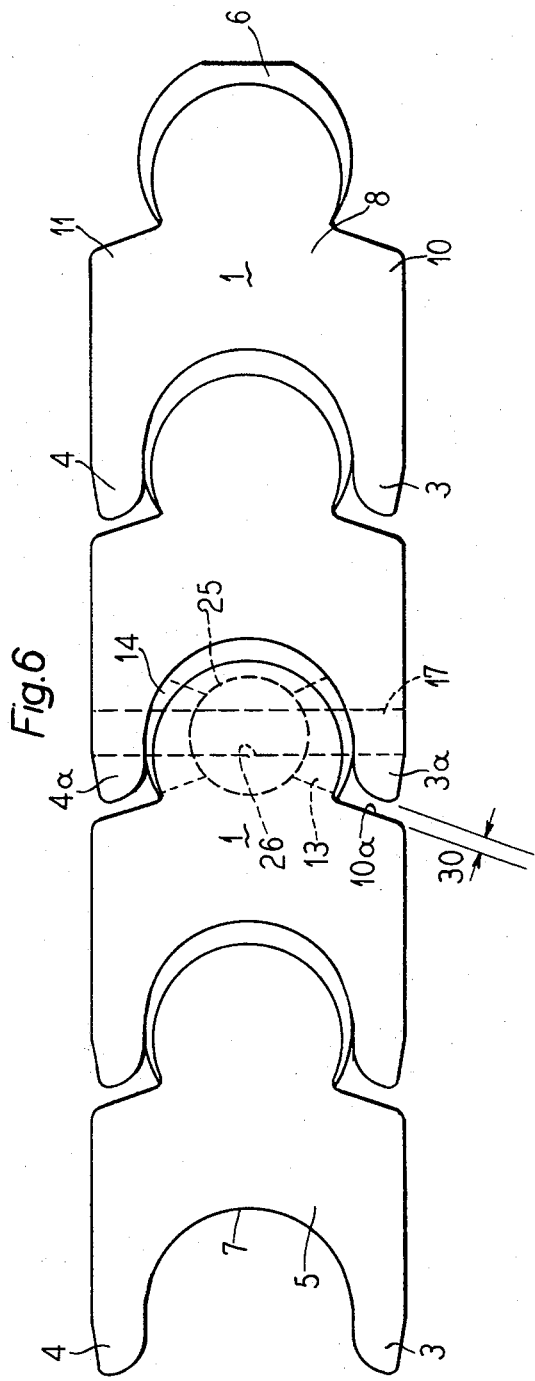

CONVEYOR BELT CHAIN

The present invention relates to conveyor belts, and particularly such belts comprising a series of links connected for relative angular movement of the links.

PRIOR ART

Such conveyor belts are well known in the art, normally comprising a series of flat links having a carrier surface for transporting objects such as bottles, cans or similar objects. The link elements normally are hinged to each other for relative turning movement around a horizontal axis and are guided by means of guiding rails along a straight horizontal or inclined conveyor path and passed over guiding and driving chain sprockets, the series of links forming an endless belt having a return portion underneath the operative transport portion. The said hinge coupling only allows angular movement of the belt in one, normally vertical plane.

SUMMARY OF THE INVENTION

The present invention has for its object a conveyor belt chain link for connection with adjacent links in order to form a conveyor belt of the above mentioned kind, which is capable of changing its direction of movement in two perpendicular planes whereby the conveyor belt can be conventionally guided over chain sprockets and additionally be guided in curves in its normally horizontal operative transport plane. This eliminates the need for separate switching units for changing the transport direction of conventional link belts normally operating along a straight transport path.

According to the present invention there is provided a conveyor belt chain link comprising a substantially cylindrical head portion and two bifurcated legs extending therefrom, said head portion and legs integrally joining a flat surface portion on one side thereof forming a carrier surface and defined by the head portion periphery and longitudinally extending edges of carrier surface side flange portions extending from the extremities of said legs and turning into laterally extending flange side edges joining the head portion periphery, and a recessed edge portion between the leg extremities corresponding to the head portion periphery.

An illustrative embodiment of the invention will hereinafter be described with reference to the accompanying drawing, wherein:

FIG. 5 is a side view showing four connected chain links forming a part of a conveyor belt.

FIG. 6 is a plan view of the top side of the connected chain links according to FIG. 5.

Figure 1:
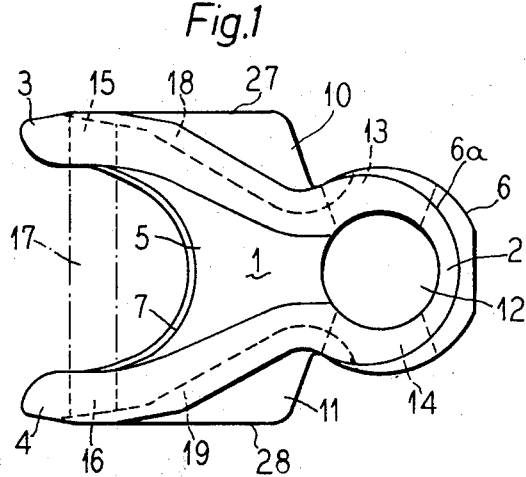
FIG. 1 is a plan view of the chain link showing the bottom side thereof.

Referring to FIG. 1 the chain link 1 comprises a substantially cylindrical head portion 2 from which extend two legs 3 and 4. In the preferred embodiment as illustrated in FIG. 1 said legs diverge from the head portion including a space therebetween. On the top side thereof the head portion 2 and the legs 3 and 4 integrally join a flat top surface portion 8 forming the carrier surface of the link. The top surface 8 is defined by two parallel edges 27, 28 extending from the extremities 3a and 4a of the legs 3 and 4 respectively in a direction towards the head portion of the link. In this direction the top surface is further defined by two substantially laterally extending edge portions 10a and 11a between the periphery 6 of the head portion and the side edges 27 and 28. Said lateral edge portions are preferably inclined in a direction from the head portion, thus including an obtuse angle therebetween. The top surface portion extends between the legs forming a central portion 5, said central portion being defined by a recessed edge portion 7 having a curved shape corresponding to the shape of head portion periphery 6.

Figure 4:
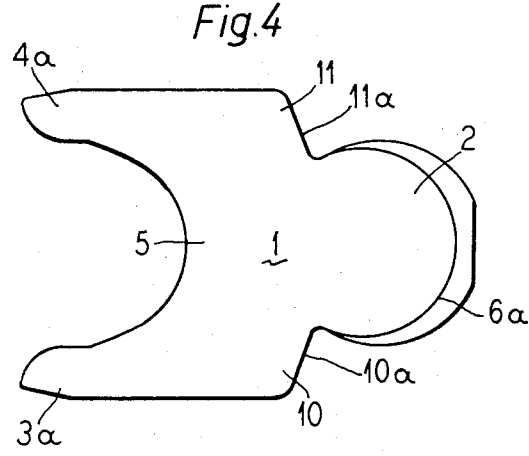
FIG. 4 is a plan view of the load carrying top surface of the chain link.
Figure 7:
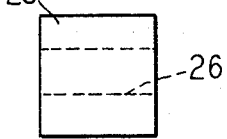
FIG. 7 is a side view of a coupling bolt for interconnecting the links and FIG. 8 a plan view of said bolt.
Figure 8:
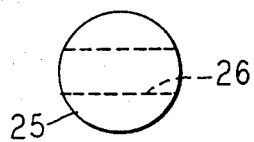

The carrying top surface of the link thus defined is best shown on FIG. 4. The head portion edges are bevelled at 6a, the bevelled surface preferably being spherical.

Figure 2:
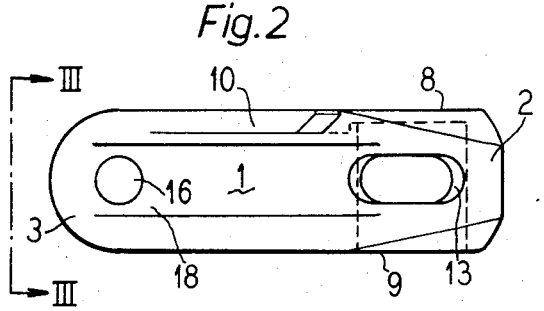
FIG. 2 is a side view of the chain link.
Figure 3:
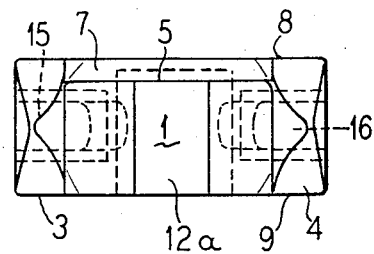
FIG. 3 is an end view of the chain link seen from the line III—III in FIG. 2.

As illustrated on FIGS. 1, 2 and 3 the head portion is provided with a laterally extending aperture or bore 13, 14. This bore has a longitudinally extending oblong section, the end portions of which are tapering inwardly. The head portion further has a central cylindrical bore 12 extending from the back side 9 of the link and having a bottom forming part of the top side surface portion. The lateral apertures 13, 14 extend between the periphery 6 and the bore 12 of the head portion. As seen in FIGS. 1 and 3 the central bore 12 has an opening 12a facing the space included between legs 3, 4.

A bore 15, 16 extends laterally through the extremity portions 3a, 4a of the legs for receiving a pin 17 secured therein. Said pin 17 is indicated with dash dotted lines in FIG. 1. The space included between the leg extremity portions 3a and 4a and the recessed edge portion 7 is adapted to receive the head portion of an adjacent connected link, the pin 17 extending through apertures 13, 14 of said adjacent link head portion. The diameter of the cylindrical pin 17 is a little less than the width of the oblong apertures 13, 14 whereas a substantial clearance longitudinally at each side of the pin 17 is provided. In this way it will be understood that the connected links can perform an angular movement relative to each other in two perpendicular planes, one of which passes through top surface 8. As observed above the edge portions 10a and 11a are inclined, including an obtuse angle the apex of which is off-set from the centre of the head portion 2 in a direction away from the head portion 2. By this arrangement there is provided sufficient room for the leg extremities 3a, 4a to perform an angular movement around the head portion centre line. The edge portion 7 has a shape corresponding to the the periphery 6 of the head portion 2 and may be bevelled in order to form a suitable engagement surface against the bevelled edge 6a of periphery 6.

In a preferred embodiment, particularly in case of conveyor belts subject to heavy loads and dynamic forces, a coupling bushing 25 is rotatably received in the bore 12, the outer periphery of the bushing forming a bearing surface against the bore surface. The bushing has a lateral bore 26 adapted to receive the pin 17 of an adjacent connected link, forming a bearing surface for relative rotation of the pin 17 within the bore 26. It will be understood that the link connection in this embodiment enables the same relative angular movements as in the case described above. Better engaging bearing surfaces are, however, provided in the latter case, enabling the conveyor belt to receive higher loads transferred through the link connections. Alternatively a ball shaped member can replace the bushing 25, in which embodiment the diameter of the ball is made to fit into the bore 12 for bearing against the surface thereof.

The side surfaces of the legs 3, 4 are provided with longitudinal grooves 18 and 19 respectively, as shown in FIGS. 1 and 2. These grooves are provided to receive longitudinal guide rails along the conveyor belt sides, extending along the straight as well as the curved portions of the conveyor belt. In addition to said guiding rails the conveyor belt may be supported from below the rails by similar flat members engaging the lower side 9 of the links. By means of said guiding rails a very effective guiding of the conveyor belt is obtained over straight horizontal and inclined portions thereof as well as through the curved portions of the belt. For driving purpose and for returning the return portion of an endless conveyor belt comprising the above described chain links, driven or idle sprocket wheels are used having teeth engaging the cavities formed between legs 3, 4 of each link.

FIGS. 5 and 6 illustrate a portion of a conveyor belt, including four chain links as described above. In FIG. 6 showing the conveyor belt portion top surface the link connection is indicated in dotted lines between the second and the third link of the link series shown. This link connection is illustrating the embodiment including the coupling bushing 25. Pin 17 is shown extending between the leg extremities 3a, 4a and is secured therein. Pin 17 is received in the bushing 25 and bears against the surface of the bore 26 therein. The clearance between the pin 17 and the apertures 13, 14 is illustrated. A clearance 30 between leg extremity 3a and edge portion 10a of the adjacent link is illustrated, a corresponding clearance existing at the opposite side of the links.

The links may be made of any suitable material. For many purposes a plastic material such as nylon is preferred, which lends itself well for mass production by conventional methods such as molding. Such material and manufacturing methods may also be used for production of connecting bushings 25, whereas stainless steel is preferred for connecting pin 17.

What I claim is:

1. A chain conveyor for carrying objects on a transport surface thereof, said conveyor being composed of links in which each link comprises:
    a. a substantially cylindrical head portion;
    b. a pair of bifurcated legs extending therefrom substantially in the longitudinal direction of the chain conveyor, said legs diverging from said head portion and having a space therebetween at their extremities receptive of the head portion of an adjacent link to be connected with said first-mentioned link; and
    c. a carrier portion joined integrally with said head portion and said legs, the upper side of said carrier portion being a continuous flat transport surface overlying said head portion and said legs, said surface at one end comprising the upper periphery of said head portion, the opposite end of said carrier portion being a web interconnecting said legs and having a generally concave edge between the leg extremities corresponding in shape to said upper periphery of said head portion, and said carrier portion including a pair of side flange portions extending longitudinally from the extremities of said legs and laterally to said head portion, and said flanges defining the longitudinal edges of said continuous flat transport surface.

2. A conveyor in accordance with claim 1, wherein the laterally extending part of said side flange portions form an obtuse angle having its apex offset from the center of said head portion for providing clearance for the extremities of an adjacent link for enabling relative angular movement of said links in a plane through said flat transport surface.

3. A conveyor in accordance with claim 1, wherein the outer surface of each leg of each link has a central groove extending along its length for reception of a guiding means along the conveyor path.

* * * * *